Patented May 20, 1952

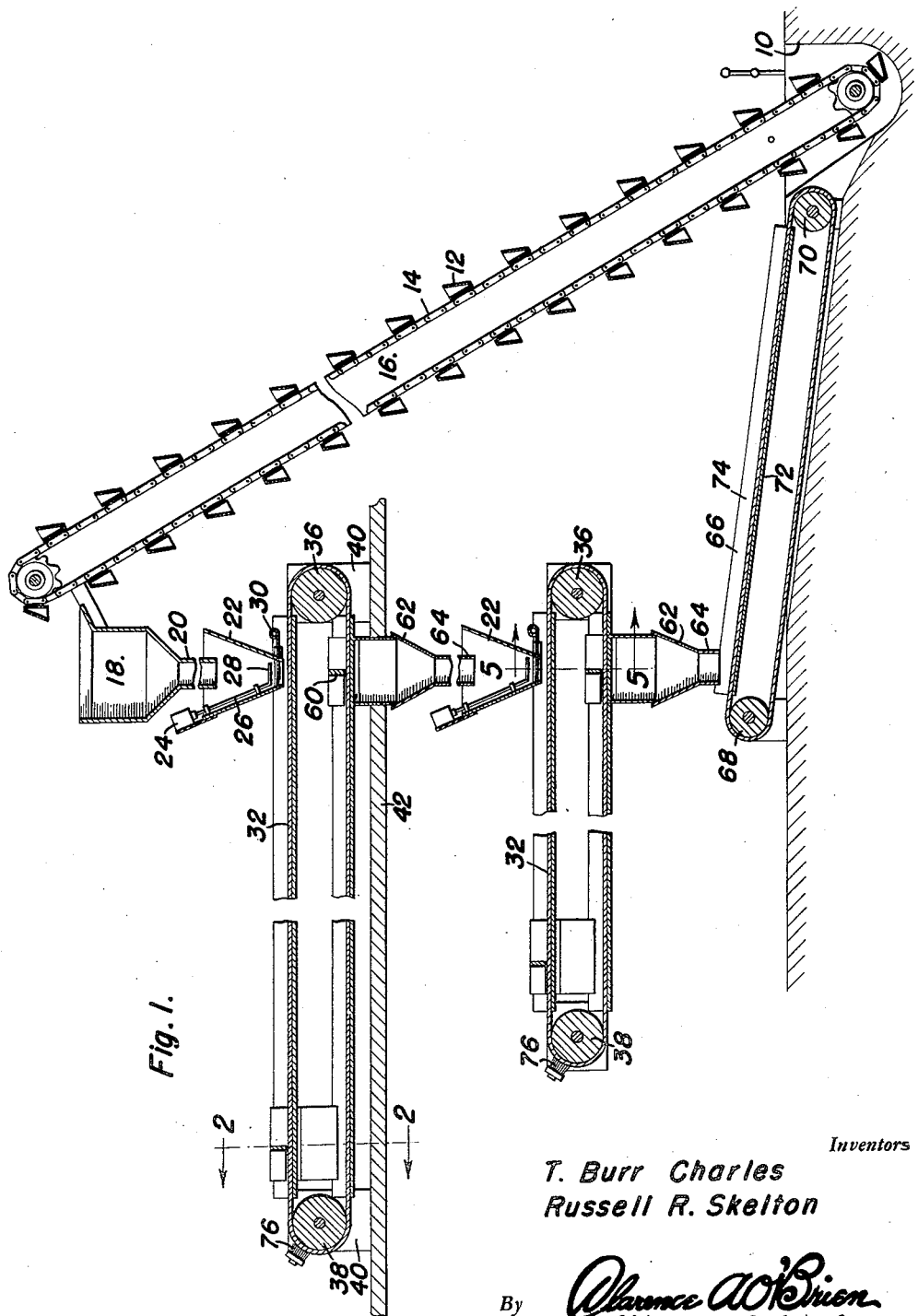

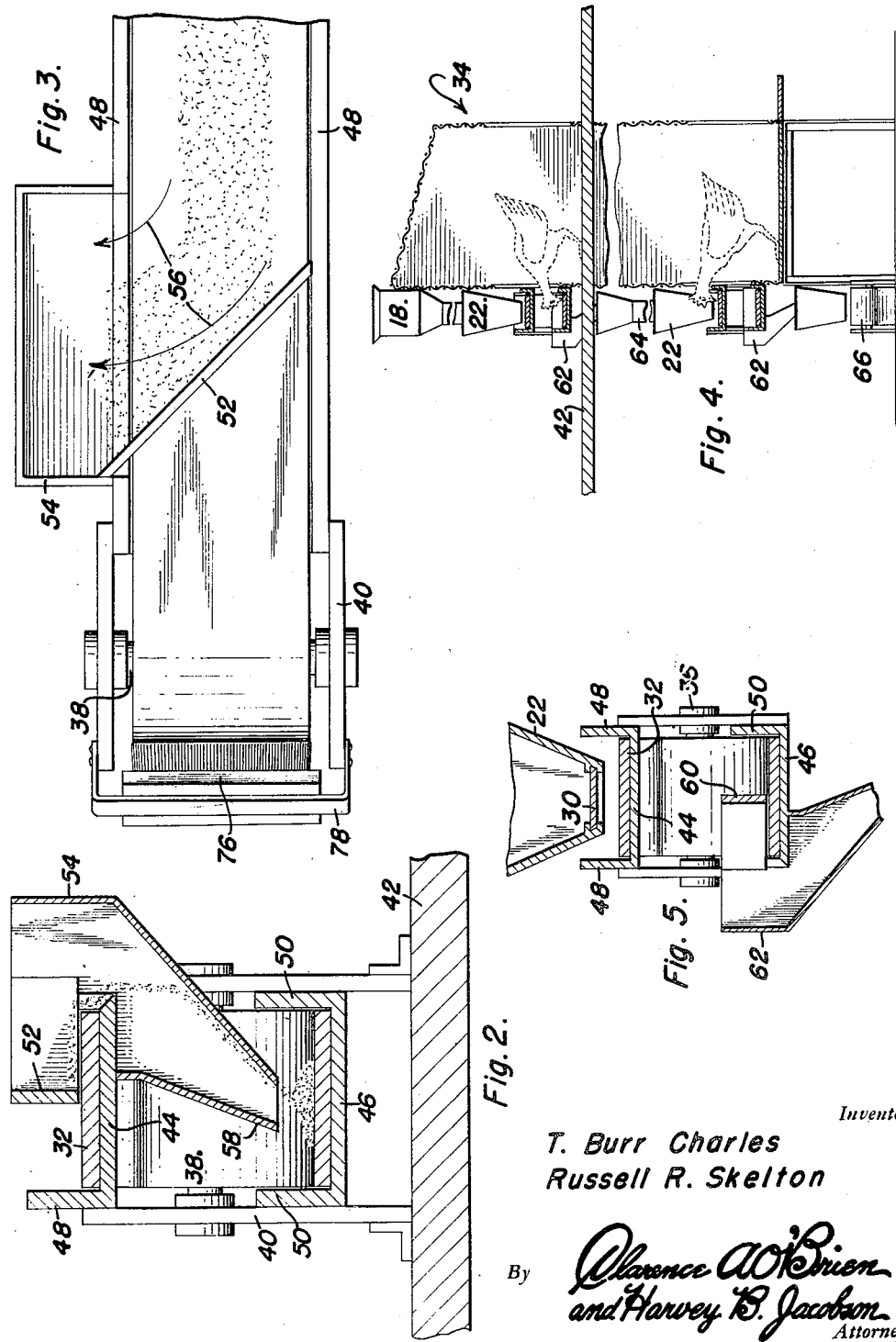
Inventors
T. Burr Charles
Russell R. Skelton

2,597,064

UNITED STATES PATENT OFFICE 2,597,064

AUTOMATIC FEEDING SYSTEM

T. Burr Charles and Russell R. Skelton,
Durham, N. H.

Application July 15, 1949, Serial No. 105,026

5 Claims. (Cl. 198—85)

This invention comprises novel and useful improvements in an automatic feeding system and in general has reference to an improved conveyor system for continuously circulating material from a storage bin to a plurality of horizontally travelling, vertically spaced conveyors. Although not limited thereto, the invention is particularly adapted for the continuous circulation of feed from a storage bin to the various poultry cages or pens disposed upon vertically spaced, horizontal levels of a battery or laying house.

The principal objects of this invention are to provide an improved apparatus for continuously circulating material from a storage bin throughout a series of vertically spaced, horizontal levels. A further object of the invention is to provide an improved construction of conveyor wherein material may be transported upon the upper flight of an endless conveyor along a horizontal level to a predetermined station, and may then be transferred to the upper surface of the lower flight of the same endless belt for travel in the reverse direction upon the same horizontal level, and thereafter may be removed and deposited upon the upper flight of the next adjacent underlying conveyor, and this operation repeated throughout the entire series of horizontal conveyors, and thereafter the residue of the material may be returned to the storage bin for recirculation.

A further important object of the invention is to provide an improved means for effecting the transfer of material from the upper to the lower flights of the different horizontal conveyors, and for removing the material from the lower flight and depositing the same upon the upper flight of the next adjacent conveyor therebeneath.

A still further feature of the invention comprehended the provision of a combined metering and agitating device disposed beneath a dispensing bin for each of the horizontal conveyors, and delivering predetermined quantities of material to the upper flight of a horizontal conveyor disposed therebeneath.

These, together with various ancillary features and objects of the invention which will later become apparent as the following description proceeds, are attained by this invention, a preferred embodiment of which has been illustrated by way of example only in the accompanying drawings, wherein:

Figure 1 is an elevational view, partly diagrammatic and partly shown in section, parts being broken away, illustrating an apparatus for carrying out the principles of this invention;

Figure 2 is a vertical transverse sectional detail view taken substantially upon the plane of the section line 2—2 of Figure 1, and illustrating the construction of a discharge or transfer means for transferring material from the upper to the lower flight of a horizontal conveyor;

Figure 3 is a fragmentary top plan view of a portion of a horizontal conveyor adjacent the material transferring end thereof in accordance with this invention;

Figure 4 is a fragmentary vertical sectional view showing the manner of applying the conveyor system as an automatic feeder to a poultry battery; and Figure 5 is a vertical transverse sectional detail view taken substantially upon the plane of the section line 5—5 of Figure 1 and illustrating the construction of the discharge means for removing material from the lower flight of a horizontal conveyor for discharging the same to the next conveyor therebeneath or to the return means for the storage bin.

Referring now more specifically to the accompanying drawings wherein like numerals designate similar parts throughout the various views, Figures 1-3 and 5 illustrate the principles of this invention applied to a conveyor system which is of general application wherein it is desired to maintain a controlled and a continuous circulation of a material along a plurality of horizontal levels which are separated from or vertically spaced from each other, and wherein the material is dispensed to the various horizontal conveyors at predetermined adjusted rates, the residue of the material being eventually returned to the storage bin for recirculation.

In Figure 1, it will be seen that there has been provided a storage bin indicated generally by the numeral 10, and which may be of any suitable construction and located at any desired place, as, for example, in the basement of a building, the bottom floor of a poultry house, or the like. The material to be distributed by the conveyor and transported thereby is to be discharged or deposited in the bin in any desired manner, and it is thereupon elevated as by buckets or receptacles 12 attached to an endless chain 14 of any conventional type of elevator indicated generally by the numeral 16.

The material lifted by the elevator 16 is discharged from the upper end thereof into a dispensing hopper 18, having outlet passage or port 20 in the lower end thereof. Disposed beneath this outlet passage, as shown by Figure 1, is the open upper end of a hopper or receptacle 22 forming a combined agitating and metering device. For this purpose, the receptacle 22 has mounted thereon an electric motor 24 or any other suitable power means by means of which an agitator shaft or rod 26 having an agitator blade 28 thereon may be reciprocated within the receptacle 22 adjacent the open lower discharge end thereof.

A manually adjustable, laterally and horizontally movable gate valve of any known conventional construction and indicated by the numeral 30 is provided at the bottom of each of the metering and dispensing devices 22. By this means, material discharged into the open upper end of the metering device 22 may be discharged from the lower end thereof in a metered and regulated rate of flow and delivered to the upper flight of a horizontally disposed endless belt conveyor 32 which is disposed therebeneath.

As will be seen from Figure 1, it is contemplated that a plurality of such horizontally disposed conveyors 32 may be mounted in any suitable manner, but preferably beneath each other in order to render the entire system more compact, there being a metering and agitating device 22 disposed above the upper flight of each of the horizontally extending conveyors 32. Preferably, the metering devices are disposed adjacent one end of the horizontal conveyors, whereby the entire upper flight may be employed for moving the material horizontally at different levels throughout a desired horizontal extent. During this travel, the material may be removed from the conveyor at different stations as desired and for different purposes; and when employed as a feed conveying system for poultry batteries or houses, the horizontal conveyors as shown in Figure 4 may be positioned closely adjacent the different vertically disposed horizontal rows of cages of the battery, indicated generally by the numeral 34, so that the fowls retained in the battery may have access to the feed which slowly is moved past the individual cages and presented to the fowls.

As shown more clearly in Figure 1, each of the horizontal conveyors 32 may conveniently consist of an endless belt of any desired material which is entrained over a pair of supporting rollers 36 and 38 mounted upon any suitable supports 40 on a floor or other horizontal supporting surface 42, the arrangement being the same for each of the horizontal conveyors. Preferably, as shown best in Figure 2, the upper and lower flights of the conveyor are supported upon horizontal supporting surfaces 44 and 46, respectively, the surface 44 having upstanding side flanges 48 forming side walls, while the member 46 has similar side walls 50. These side walls 48 and 50 serve to retain the material upon the upper surfaces of the upper and lower flights of the belt 32, while the members 44 and 46 respectively support the upper and lower flights of the belt.

At any convenient point along the horizontally extending length of the endless conveyor 32, there are provided one or more discharge or transfer means for removing all or a part of the material from the upper flight of the belt. When the device is employed as an automatic feeder for chickens or other poultry, it is preferred to position the removing or transferring means at the extreme end of the travel of the upper flight of the belt and for removing all of the material by a single transfer means. However, the invention further contemplates and includes arrangements whereby a plurality of transfer means could be employed along the length of the belt for removing various proportions of the material from the belt at different stations as desired.

In any event, it is preferred and is an important part of this invention to transfer the material reaching the far end of the horizontal stretches of the upper flight of the conveyors to the upper surface of the lower flight in order that the material may be returned upon the same horizontal level and may be thereafter delivered to the next horizontal conveyor disposed vertically therebeneath. This transfer and material discharging means may conveniently comprise a baffle 52 which, if desired, may be attached to and carried by the side walls 48, and which extends transversely of the belt and at an angle to the line of travel of the belt, so that as shown in Figure 3, the material travelling upon the belt will be directed by the baffle laterally of the belt and discharged from the side thereof.

Mounted in any desired manner, as upon the supporting member 44, a side wall 48, or both, is a transfer or discharge chute 54, whose open upper end is positioned to receive the material discharged by the baffle 52, as shown by the arrows 56 in Figure 3. The lower or discharge end or discharge port of the transverse chute 54 is directed between the upper and lower flights of the belt and terminates in a downwardly opening and directed discharge port 58 which deposits the material so transferred to the upper surface of the lower flight of the belt 32, as shown in Figure 2.

The material returning upon the upper surface of the lower flight of the horizontal belt may likewise be removed therefrom at various predetermined stations as set forth above; but it is preferred in applying this invention for the purposes of automatically supplying feed to batteries of fowl to remove material from the lower flight at a station which is substantially in vertical alignment with but spaced below the metering and agitating device disposed above the upper flight of the same belt. For this purpose, the arrangement shown in Figure 5 is found to be satisfactory.

At the discharging station of the lower flight, a laterally disposed stationary baffle 60 is employed which may be of the same construction as that set forth with regard to the baffle 52, and which likewise directs the material upon the belt laterally thereof for discharge from the side of the belt. The discharged material is received in the upper end of a discharge chute 62, whose lower end has a downwardly extending pipe or conduit 64 which opens into the open upper end of a second agitating and metering device 22. The construction for each succeeding horizontal level is thus substantially identical and the operation is the same as that previously set forth. However, the lowermost level of horizontal conveyors has the discharge passage 64 opening into the upper surface of a return conveyor 66 which may be of any desired construction such as the endless belt type and which is entrained over supporting rollers 68 and 70, the upper flight of the belt being supported upon a longitudinally extending transverse member 72 which is provided with side walls 74 to constitute guide means for retaining the material upon the conveyor. This conveyor may be inclined as desired and at its discharge end opens into the previously mentioned bin 10.

As described, it will be seen that the material circulated by the conveyor may be readily controlled as to quantity and rate of flow by adjusting the speed of the elevator 16 in any desired manner, by adjusting the speed of the individual horizontal conveyors 32 in any desired manner, and by regulating the metering valves 30 of each of the metering agitating devices 22.

It will thus be seen that there has been provided a conveyor system which is readily adjustable for regulating the rate of flow, and which is compact and permits the various vertically spaced horizontal conveyors to be compactly arranged.

As shown in Figures 1 and 3, the various horizontal conveyors, at what may be termed their outer supporting rollers 38 at the discharge ends of the upper flights of the conveyors, are provided with transversely extending cleaning brushes 76 supported by suitable framework 78 from the supports 40 of the rollers 38, whereby the brushes will engage the outer surface of the endless belts and cleanse the same. If desired, similar brushes can be placed at the other ends of the belt, and further, brushes could also be positioned between the upper and lower flights of the belt for cleansing the inner surface thereof.

From the foregoing, the construction and operation of the device, together with its obvious advantages, will be readily understood, and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention, what is claimed as new is:

1. A conveyor system for feeders comprising a storage bin, a dispensing hopper, an elevator delivering material from said bin to said hopper, a metering device receiving material from said hopper, an endless horizontal conveyor having upper and lower flights and positioned for receiving material from said metering device upon its upper flight, discharge means for transferring material from the upper flight to the upper surface of the lower flight, means for returning material from said lower flight to said bin.

2. In a conveyor system, a storage bin and a dispensing hopper, a plurality of vertically spaced, horizontally extending endless belt conveyors each having upper and lower flights, means for dispensing material from the hopper to the upper flight of the topmost conveyor, discharge means for transferring material from the upper flight to the upper surface of the lower flight of each conveyor, means for removing material from the lower flight of each conveyor to the upper flight of the next conveyor therebeneath and material return means for returning material from the lower flight of the bottom conveyor to the bin.

3. A conveyor system for feeders comprising a storage bin, a dispensing hopper, an elevator delivering material from said bin to said hopper, a metering device receiving material from said hopper, an endless horizontal conveyor having upper and lower flights and positioned for receiving material from said metering device upon its upper flight, discharge means for transferring material from the upper flight to the upper surface of the lower flight, means for returning material from said lower flight to said bin, said discharge means including a baffle associated with the upper flight and directing material thereon laterally thereof, a chute having an inlet adjacent said baffle and an outlet over the lower flight.

4. In a conveyor system, a storage bin and a dispensing hopper, a plurality of vertically spaced, horizontally extending endless belt conveyors each having upper and lower flights, means for dispensing material from the hopper to the upper flight of the topmost conveyor, discharge means for transferring material from the upper flight to the upper surface of the lower flight of each conveyor, means for removing material from the lower flight of each conveyor to the upper flight of the next conveyor therebeneath and material return means for returning material from the lower flight of the bottom conveyor to the bin, said discharge means including a baffle associated with the upper flight and directing material thereon laterally thereof, a chute having an inlet adjacent said baffle and an outlet over the lower flight.

5. A conveyor system for feeders comprising a storage bin, a dispensing hopper, an elevator delivering material from said bin to said hopper, a metering device receiving material from said hopper, an endless horizontal conveyor having upper and lower flights and positioned for receiving material from said metering device upon its upper flight, discharge means for transferring material from the upper flight to the upper surface of the lower flight, means for returning material from said lower flight to said bin, said last means including an endless conveyor discharging into said bin, a chute discharging upon said endless conveyor, a stationary baffle upon the upper surface of the lower flight for directing material laterally of said lower flight into said chute.

T. BURR CHARLES.
RUSSELL R. SKELTON.

REFERENCES CITED

The following references are of record in the file of this patent:

UNITED STATES PATENTS

| Number | Name | Date |
| --- | --- | --- |
| 312,341 | Duryea | Feb. 17, 1885 |
| 587,509 | Roberts | Aug. 3, 1897 |
| 648,001 | Thurber | Apr. 24, 1900 |
| 1,093,815 | Whittier | Apr. 21, 1914 |
| 2,108,869 | Sandmeyer | Feb. 22, 1938 |
| 2,302,314 | Haggart | Nov. 17, 1942 |